United States Patent
Dorland

(10) Patent No.: US 7,398,307 B2
(45) Date of Patent: Jul. 8, 2008

(54) METHOD AND SYSTEM FOR MANAGING A NETWORK

(75) Inventor: Chia-Chu S. Dorland, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 919 days.

(21) Appl. No.: 10/425,727

(22) Filed: Apr. 30, 2003

(65) Prior Publication Data

US 2004/0221026 A1 Nov. 4, 2004

(51) Int. Cl.
*G06F 15/16* (2006.01)
*G06F 15/173* (2006.01)

(52) U.S. Cl. .................. 709/223; 709/217; 709/226; 709/229; 709/238

(58) Field of Classification Search .................. 705/26; 713/300; 709/223, 229, 250, 238, 226, 224, 709/203
See application file for complete search history.

(56) References Cited

U.S. PATENT DOCUMENTS

| | | | | |
|---|---|---|---|---|
| 7,050,094 B2* | 5/2006 | Krymski | ................. | 348/221.1 |
| 7,099,947 B1* | 8/2006 | Nadeau et al. | ............. | 709/250 |
| 2002/0147815 A1* | 10/2002 | Tormasov et al. | ........... | 709/226 |
| 2002/0154628 A1* | 10/2002 | Akasaka et al. | ............. | 370/352 |
| 2002/0156697 A1* | 10/2002 | Okuhara et al. | ............... | 705/26 |
| 2002/0161917 A1* | 10/2002 | Shapiro et al. | .............. | 709/238 |
| 2003/0046390 A1* | 3/2003 | Ball et al. | ................... | 709/224 |
| 2003/0115251 A1* | 6/2003 | Fredrickson et al. | ........ | 709/201 |
| 2003/0117966 A1* | 6/2003 | Chen | .......................... | 370/255 |
| 2003/0131129 A1* | 7/2003 | Becker et al. | ............... | 709/238 |
| 2003/0179742 A1* | 9/2003 | Ogier et al. | ................. | 370/351 |
| 2003/0204756 A1* | 10/2003 | Ransom et al. | ............. | 713/300 |
| 2004/0107242 A1* | 6/2004 | Vert et al. | .................... | 709/203 |
| 2004/0111469 A1* | 6/2004 | Manion et al. | ............. | 709/204 |
| 2004/0111505 A1* | 6/2004 | Callahan et al. | ............. | 709/223 |
| 2004/0155899 A1* | 8/2004 | Conrad | ....................... | 345/736 |
| 2004/0177136 A1* | 9/2004 | Chen et al. | .................. | 709/229 |

* cited by examiner

*Primary Examiner*—Quang N. Nguyen

(57) ABSTRACT

In an exemplary method, a network having first and second network manager devices is managed by independently managing a first operation using a first logic of the first network manager device, including managing a first portion of a database, and by independently managing a second operation using a second logic of the second network manager device, including managing a second portion of the database. A peer-to-peer interface can communicate information between the first and second network manager devices. In an exemplary embodiment, a system for managing a network includes a plurality of network manager devices, each device including a logic for managing a different operation, a database, and a peer-to-peer interface for sending queries to a different network manager device in the plurality and receiving queries from the different network manager device in the plurality.

34 Claims, 4 Drawing Sheets

METHOD AND SYSTEM FOR MANAGING A NETWORK

BACKGROUND

In traditional network or e-service agent-server management environments, data collected and events received by the agent are sent back to a single management station server before they can be displayed and accessed by operators. This single management station server can effectively manage only a limited number of nodes on the network. The agents act like slaves of the server, and cannot be accessed or viewed directly by other existing applications or by users. In addition, agents and the management station server must reside on the same side of a firewall. In addition, the number of managed devices and/or applications that the single management station server can handle is finite.

SUMMARY

An exemplary method of managing a network, the network having first and second network manager devices, includes independently managing a first operation using a first logic of the first network manager device, including managing a first portion of a database, independently managing a second operation using a second logic of the second network manager device, including managing a second portion of the database, and communicating information between the first network manager device and the second network manager device using a peer-to-peer interface for sending and receiving queries. An exemplary machine readable medium includes software or a computer program for causing a computing device to perform the exemplary method.

An exemplary system for managing a network includes a plurality of network manager devices, each device including a logic for managing a different operation, a database, and a peer-to-peer interface for sending queries to a different network manager device in the plurality and receiving queries from the different network manager device in the plurality, wherein the peer-to-peer interface used by each of the plurality of network manager devices is the same.

An exemplary system for managing a network includes means for independently managing a first operation using a first logic of the first network manager device, including managing a first portion of a database, means for independently managing a second operation using a second logic of the second network manager device, including managing a second portion of the database, and means for communicating information between the first network manager device and the second network manager device using a peer-to-peer interface for sending and receiving queries.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF THE EXEMPLARY EMBODIMENTS

Figure 1:
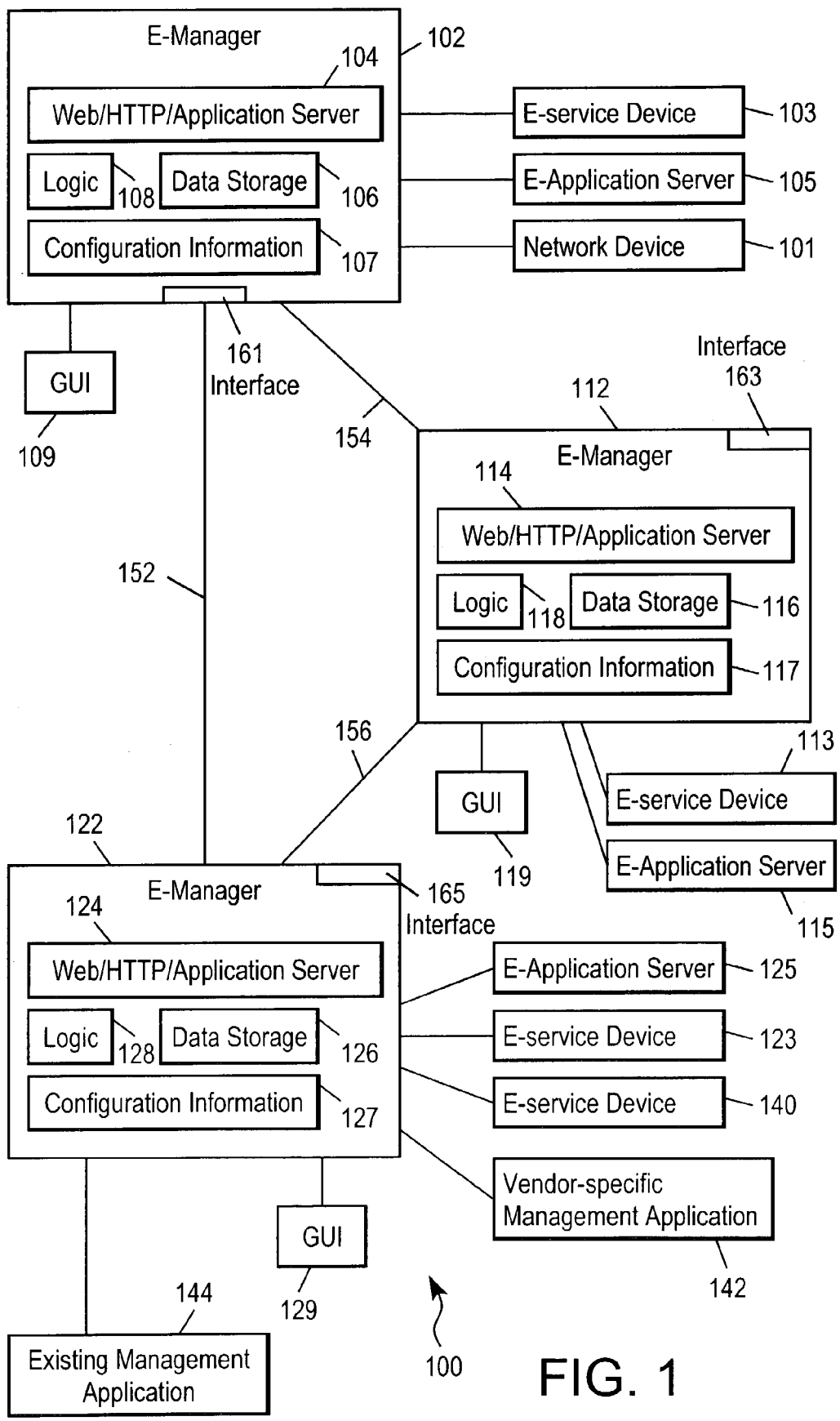
FIG. 1 illustrates an exemplary embodiment.

FIG. 1 illustrates a system for managing a network, in accordance with an exemplary embodiment. The system includes a plurality of network manager devices or e-managers 102, 112, 122 shown in FIG. 1. Each e-manager is a management system that manages a group of devices and applications, for example e-devices and e-applications. The managed devices and/or applications can be heterogeneous-type devices and services or applications. Management data can be pushed to or from, and/or pulled to or from, each e-manager, or can be pulled by existing applications, such as existing independent management applications, for example Hewlett Packard Network Node Manager (NNM). In accordance with an exemplary embodiment, a completely independent application, for example NNM, can access or query e-managers and e-integration managers. For example, in accordance with an exemplary embodiment, NNM can query e-managers or e-integration managers about management information of some e-service devices that are not managed by NNM, and pull the data received in response to the queries into the NNM and make the management information available to NNM users.

Each e-manager 102, 112, 122 also includes a peer-to-peer interface 161, 163, 165. The interfaces 161, 163, 165 are identical, and can be implemented so that the e-managers can communicate with each other or other applications, for example across a firewall. The peer-to-peer interface can be implemented using XML/SOAP over HTTP/HTTPS, and can support XML RPC calls. "XML" is an abbreviation or acronym for eXtensible Markup Language. "SOAP" is an abbreviation or acronym for Simple Object Access Protocol. SOAP generally can include two parts: a first part that enables programmers to produce and parse SOAP XML messages, and a second part that acts as an end point for SOAP communication at a server, which then uses objects to deliver the requested service. "HTTP" is an abbreviation or acronym for HyperText Transfer Protocol, or world-wide-web protocol. "HTTPS" is an abbreviation or acronym for Hyper Text Transfer Protocol Secure sockets. "RPC" is an abbreviation or acronym for Remote Procedure Call, which can for example be XML-based. The peer-to-peer interfaces 161, 163, 165 can be used for sending queries to a different network manager device or e-manager, and for receiving queries from the different network manager device or e-manager. Each e-manager can proactively communicate with other e-managers or applications (for example, existing applications) via its peer-to-peer interface. This structure of e-manager communication ensures scalability of e-service management, by allowing an e-manager to collect management data through/from different, surrogate e-managers.

Each of thee-managers 102, 112, 122 includes a logic 108, 118, 128 for managing an operation. The logic 108, 118, 128 can be a business logic. The operation corresponding to a network manager device or e-manager can include tasks, for example, the tasks of managing device(s) and/or application(s) connected and/or assigned to the network manager device or e-manager. For example, FIG. 1 shows the e-manager 102 managing an e-service device 103, an e-application server 105, and a network device 101. The network device 101 can be, for example, a network hardware component such as a switch or a router. The e-manager 112 manages an e-service device 113 and an e-application server 115, and the e-manager 122 manages an e-application server 125, an e-service device 123, and e-service device 140, and a vendor-specific management application 142. The e-manager 122 is also connected to an existing management application 144.

Each of the e-managers 102, 112, 122 can also support common interfaces that hide all implementation components forming the logic 108, 118, 128. These common interfaces can be used to retrieve management data from managed devices and applications. For example, the e-manager 102 can support one or more common interfaces by which it communicates with the e-service device 103, the e-application server 105, and the network device 101. These common interfaces can be different from the peer-to-peer interfaces 161, 163, 165.

As referenced herein, "e-services" is an umbrella term for services on the Internet. E-services include e-commerce transaction services for handling online orders, application hosting by application service providers (ASPs) and any processing capability that is obtainable on the World-Wide-Web or Internet. An "e-service device" is a device that helps administer an e-service, and an "e-application server" is a machine that holds e-service related programs and data shared by network users.

As referenced herein, a "business logic" is a part of an application program that performs the required data processing of the business. It refers to the routines that perform the data retrieval, update, query and report processing, and more specifically to the processing that takes place behind the scenes rather than the presentation logic required to display the data on the screen (GUI processing). Client applications are made up of a user interface and business logic. Server applications are mostly business logic. Both client and server applications also require communications links, but the network infrastructure, like the user interface, is not part of the business logic. Implementation of the business logic can be different for each network manager device or e-manager depending on the type of services, for example e-services, that the manager is responsible for managing.

As referenced herein, a database is a set of related files that is created and managed by a database management system (DBMS). A DBMS can manage any form of data including text, images, sound and video. Database and file structures can be determined by software, so that as far as associated hardware is concerned, data in the database is simply bits and bytes.

As referenced herein, an XML Schema is a definition of the content used in an XML document. The XML schema is a superset of DTD (Document Type Definition), which is the standard SGML (Standard Generalized Markup Language) schema. Various recommendations were submitted to the W3C, and a standard was approved in May 2001 that includes the ability to define data by type (date, integer, etc.). Unlike DTD, XML schemas are written in XML syntax. Although the XML schemas can be more verbose than DTD, they can be created with any XML tools.

Each e-manager can also include a database or portion of a database, for example the data storage 106, 116, 126. The database can include information about the operation that the e-manager is handling, including devices and/or applications that the e-manager is managing. For example, the data storage 106 can include information necessary for the e-manager 102 to manage the e-service device 103, the e-application server 105, and the network device 101. The data storage 106 can also include information regarding other e-managers and/or other operations (for example those administered by other e-managers). Similar principles apply to the data storage 116, 126.

Each of the e-managers can collect and process management data, for example relating to the operation and associated tasks for which it is responsible. The e-manager can collect the data using SNMP/MIB (Simple Network Management Protocol/Management Information Base) polling, CLI (Command Line Interface), FTP (File Transfer Protocol) system log files and error log files, measurement data from various probes, HTTP (HyperText Transfer Protocol), an external configuration database, local configuration files, central configuration files, and so forth. For example, the e-manager can send an HTTP request, and then analyze the data provided in response to the request. Access methods that the e-manager can apply to collect the data can be defined in a configuration file of the e-manager, which can for example be stored in the data storage of the e-manager. The e-manager can also discover managed elements (e.g., the devices and/or processes, applications or services that the e-manager has responsibility for managing) identified in configuration file associated with the e-manager. The configuration file can be user-defined. The configuration file of the e-manager can allow the user to a) specify management configuration information for managed devices, for example data/log access methods, b) specify URLs for web-access, c) schedule data polling, d) set monitoring interval(s), e) specify customer information, and so forth.

The e-manager can also filter and organize the collected data. The resulting data can be pushed to a central entity such as an e-integration manager and/or a management server, and/or can be pulled from a persistence (for example the data storage 106, 116, 126), for example in response to a query from the e-integration manager and/or the management server. The data can be pulled from the persistence by existing management applications, for example various Hewlett-Packard OpenView applications or sub-applications.

Each e-manager can be implemented with a universal access layer with different methods to access data on heterogeneous network devices and/or services, for example the devices and/or services that the e-manager manages. These devices and/or services can include, for example, content devices, content services, network devices, routers, switches, web servers, streaming media servers, and so forth. Data collected by the e-manager through the universal access layer can be formatted into a common data format, for example by the e-manager using XML (eXtensible Markup Language), and can be forwarded on request to another entity (e.g., can be used to exchange information with, or transfer information to, another e-manager or an e-integration manager) or stored, for example in the data storage of the e-manager. The common data format allows management data to be easily transferred among e-managers and e-integrations managers. The data can be stored in a flat file, in a database, or in any other format, in the data storage of the e-manager. The universal access layer can offer, for example, SNMP (Simple Network Management Protocol) polling, CLI (Command Line Interface), FTP (File Transfer Protocol), HTTP (HyperText Transfer Protocol), XML parsing, log file parsing, configuration file parsing, probe information collecting, and device or service-specific API (Application Programming Interface) support, which can for example facilitate data collection by the e-manager.

The common data format can, for example, have the following form or definition:

```
<?xml version="1.0" ?>
<PTP (Peer-to-Peer) Store>
    <EMANAGER id="EM1" name="ABC">
        <HOST dnsname="ovchia2.cnd.hp.com">
            <HTTP_SERVER URI="ovchia2.cdn.hp.com:8080" context="
```

```
            ptpmgr/em" />
        </HOST>
        <Devices>
            <Device dnsname="ovcdnce1.cnd.hp.com" id="1" label="CE590"
                status="normal" type="cache">
                <Description>Cisco Content Engine
                    590</Description>
                <Portal>http://ovcdnce1.cnd.hp.com:8080/index.html</Portal>
                <Location>Denver</Location>
                <Customers>
                    <Customer>ATT</Customer>
                    <Customer>Qwest</Customer>
                    <Customer>AOL</Customer>
                    <Customer>HP</Customer>
                </Customers>
            </Device>
            <Device dnsname="ovcdnce3.cnd.hp.com" id="3" label="CE560"
                status="normal" type="cache">
                <Description>Cisco Content Engine 560</Description>
                <Portal>http://ovcdnce13.cnd.hp.com:8080/index.html
                    </Portal>
                <Location>Fort Collins</Location>
                <Customers/>
            </Device>
        </Devices>
    </EMANAGER>
    <EMANAGER id="EM3" name="YYY">
        <HOST dnsname="ovchia3.cdn.hp.com">
            <HTTP_SERVER URI="ovchia3.cnd.hp.com:8080"
                context="ptpmgr/em" />
        </HOST>
        <Services>
            <Service dnsname="ovchia6.cnd.hp.com" id="2" status="down"
                type="RealSystem">
                <Description>"RealSystem G2 streaming media
                    server"</Description>
                <DeviceName>ovchia6.cnd.hp.com</DeviceName>
                <Clients>108400</Clients>
                <Streams>856477</Streams>
                <Violations>2000</Violations>
                <NWView>Map</NWView>
            </Service>
            <Service dnsname="ovchia7.cnd.hp.com" id="3" status="normal"
                type="WMT">
                <Description>"Microsoft Windows media
                    server"</Description>
                <DeviceName>ovchia7.cnd.hp.com</DeviceName>
                <Clients>108</Clients>
                <Streams>77</Streams>
                <Violations>0</Violations>
                <NWView>Map</NWView>
            </Service>
        </Services>
    </EMANAGER>
    <EIMANAGER id="EIM1" name="EIM XYZ">
        <HOST dnsname="chia.cdn.hp.com">
            <HTTP_SERVER URI="chia.cnd.hp.com:8888"
                context="ptpmgr/eim" />
            <Portal>http://chia.cnd.hp.com:8080/ptpmgr/EIManager.html
                </Portal>
        </HOST>
        <EMANAGERLIST>
            <EMANAGER id="EM1">
                <Site id="1" label="Fort Collins" status="normal" />
                <Portal>http://ovchia.cnd.hp.com:8080/ptpmgr/EManager.html
                    </Portal>
                <FAILOVER_EM id="EM3" />
            </EMANAGER>
            <EMANAGER id="EM2">
                <Site id="2" label="Roseville" status="down" />
                <Portal>http://ovchia2.cnd.hp.com:8080/ptpmgr/EManager.html
                    </Portal>
                <FAILOVER_EM />
            </EMANAGER>
            <EMANAGER id="EM3">
                <Site id="3" label="LA" status="normal" />
                <Portal>http://ovchia3.cnd.hp.com:8080/ptpmgr/EManager.html
                    </Portal>
                <FAILOVER_EM />
            </EMANAGER>
        </EMANAGERLIST>
    </EIMANAGER>
</PTP (Peer-to-Peer) Store>
```

Each e-manager can also include configuration information 107, 117, 127 for the e-manager 102, 112, 122. The configuration information can include a complete or partial list of neighboring e-managers, and can include a list of all e-managers. The configuration information can be installed when the e-manager is first implemented, for example when an e-manager is instantiated from a class. The configuration information can also be updated after the e-manager is first implemented.

Each e-manager can also include a Web/HTTP/Application server 104, 114, 124. The server 104, 114, 124 can convey information through the interface 161, 163, 165 to other e-managers over a communication link, for example the communications link 152 between the e-managers 102, 122, the communication link 154 between the e-managers 102, 112, and the communication link 156 between the e-managers 112, 122. The information can be drawn from the data storage 106, 116, 126 and/or the configuration information 107, 117, 127. The logic 108, 118, 128 can manage and access the data storage 106, 116, 126 and the configuration information 107, 117, 127, and can be implemented within the server 104, 114, 124.

Each e-manager can be provided with a graphic user interface (GUI), as shown in FIG. 1 where the e-managers 102, 112, 122 are respectively provided with the GUIs 109, 119, 129. The GUIs allow user(s) to a) query an e-manager regarding the status of its operation and/or the devices and applications it manages, b) query an e-manager regarding the status of other e-managers, c) manually change the configuration information of an e-manager, and so forth. For example, the GUI 109 can allow a user to access an overall view of the devices 103, 101 and the server 105, and view information regarding them. The GUIs can be Web-based or Web-accessible, for example so that a user can access or interact with an e-manager via a web-browser, and XML (eXtensible Markup Language) technologies can be used to request and generate or assemble an overall view of e-managers in a system and to generate reports regarding devices managed by the e-managers. For example, the GUIs can allow Web-based access using XML with stylesheets through Java Servlet, any CGI (Common Gateway Interface ((web scripting facility)) or ISAPI (Internet Server Application Programming Interface) dll (Data Link Layer).

Each e-manager or e-manager configuration can include the following elements or items: a) a URI (Uniform Resource Identifier) that identifies the HTTP (HyperText Transfer Protocol) server of an e-integration manager associated with the e-manager; b) a URI that identifies the HTTP server of the e-manager; c) a list of devices and/or applications and/or services that the e-manager is managing; d) a list of access methods for devices or e-services, for example those that the e-manager is managing; e) a list of device and/or e-service types and vendors that the e-manager supports; f) a list of events on which the e-manager will store information or otherwise act; g) a list of intervals to schedule when to pull data from managed devices and/or services/applications, and when to push data to an e-integration manager associated with the e-manager; h) a list of application servers from which the e-manager is receiving information; i) a URI of a secondary e-manager in case of failover; and j) URIs that identify the HTTP servers of neighboring e-managers.

In accordance with exemplary embodiments, the role of an e-manager can include the following activities or responsibilities: An e-manager assures or enables scalability of end-to-end management by collecting management data through different surrogate e-managers. Management data collected by surrogate e-managers can be aggregated and integrated by an e-integration manager in an integration manager layer before being sent out to existing management applications for network view, service view and reports. An e-integration manager can collect management data from and/or through e-managers registered with the e-integration manager, can process the collected data, and can pass it to management applications. An e-manager can react to alerts or alarms from the devices and/or services that it manages and can send the alerts or alarms, or a message based on the alerts or alarms, for example an event notification, to a central management workstation or event system. The e-manager can also support SNMP traps, and can generate appropriate alerts or alarms when the traps are triggered. The alerts or alarms that the e-manager receives or generates can be generic or user-defined. The e-manager can also provide a web-based HTML user interface, for example using stylesheets to allow access to an overall view of managed devices and can provide general reports on the devices and/or services/applications that it manages.

Figure 4:
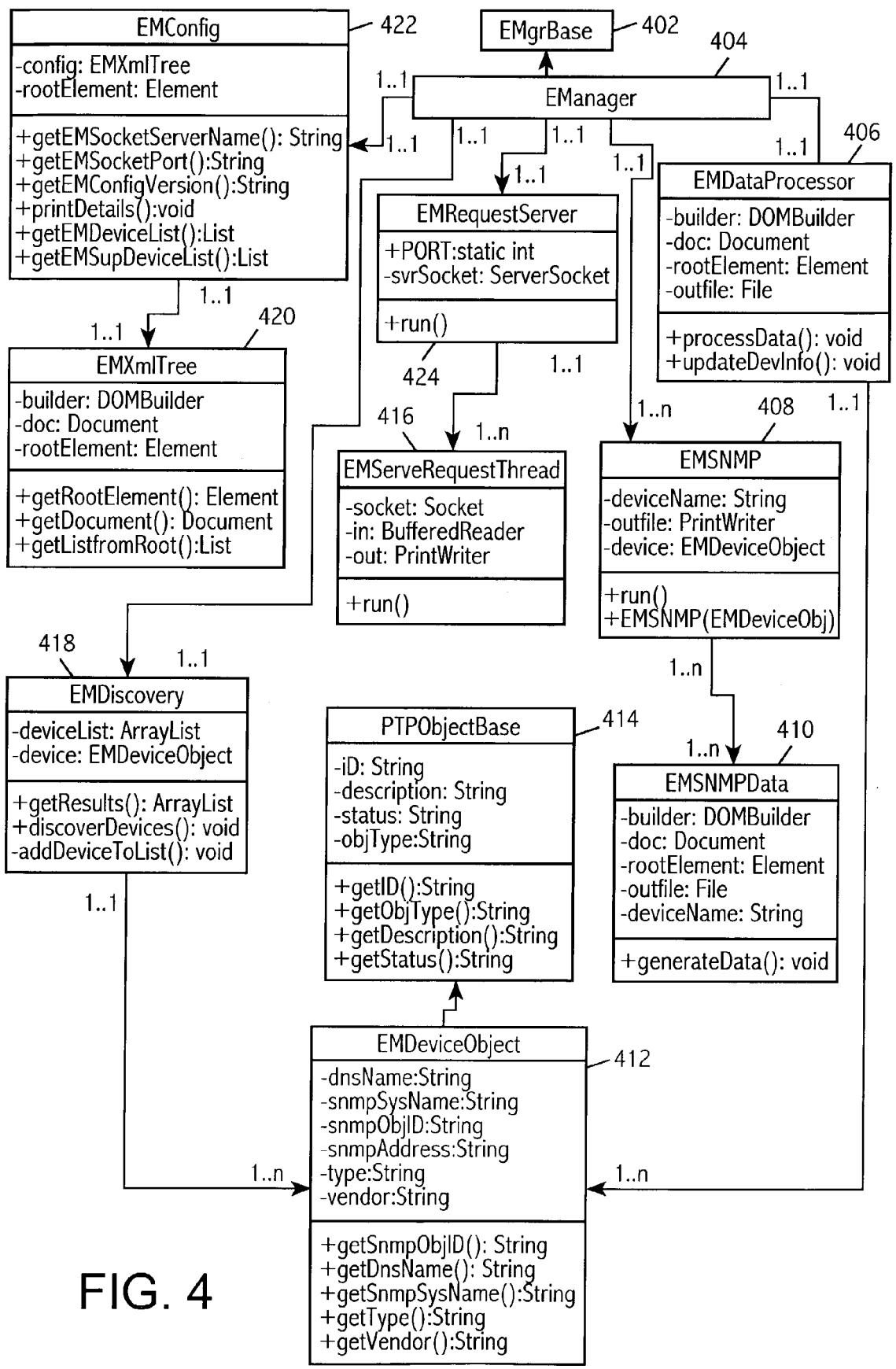
FIG. 4 illustrates a class diagram for an exemplary e-manager implementation.

FIG. 4 illustrates a class diagram for an exemplary e-manager implementation. In FIG. 4, the designations "1..1" indicate one-to-one relationships, and the designations "1. .n" indicate one-to-many relationships. FIG. 4 shows, for example, the following class elements: e-manager base 402; e-manager 404; e-manager data processor 406; e-manager SNMP (Simple Network Management Protocol) 408; e-manager SNMP data 410; e-manager device object 412; peer-to-peer object base 414; e-manager serve request thread 416; e-manager discovery 418; e-manager XML (eXtensible Markup Language) tree 420; e-manager configuration 422; and e-manager request server 424.

In accordance with an exemplary embodiment, an e-manager such as the e-manager 122 can be configured as an e-integration manager that aggregates and integrates management data received from other e-managers. For example, the e-integration manager can process duplicate devices managed among different e-managers by filtering the duplicates and/or organizing them in a hierarchy as primary managed devices, secondary managed devices, and so forth. The e-integration manager can send the management data to other applications, for example existing management applications. The e-integration manager can send the management data through its peer-to-peer interface, and/or any other appropriate interface.

For example, Network Node Manager (NNM) applications can collect information such as Content Delivery Network (CDN) devices information from e-managers, or e-integration manager(s), in the following way: A user can click on a menu item in an NNM or NNM application to view a CDN device table. In the event the NNM or NNM application does not have the information, it can invoke its CDN application to sent an HTTP request to the e-integration manager for CDN devices information. The e-integration manager can respond with cached information or information stored in a database (in a data storage of the e-integration manager or other data storage mechanism accessible to the e-integration manager), or can poll registered e-managers to request the data. The e-integration manager can provide the data to the NNM application in an XML format. The NNM's CDN application can parse and process the data provided by the e-integration manager, and can, for example, draw the CDN devices table on an NNM GUI or use a predefined XML stylesheet to display the information in a web browser. If one of the devices in the CDN devices table has a change in alert status, the NNM can receive an SNMP trap sent by one of the e-managers and use this information to update the table and/or respond by taking other action.

The e-integration manager maintains a list of all e-managers that it coordinates or monitors. The list can be maintained by a mechanism of each e-manager registering its presence with the e-integration manager, for example upon connection to the network. The registration can also indicate capabilities and/or responsibilities of the e-manager. E-managers can update the list by sending information to the e-integration manager, for example at the end of a periodic time interval, and/or when a noteworthy event occurs. For example, an e-manager can alert the e-integration manager when the e-manager delegates a task to, or receives a task from, another (e.g., neighbor) e-manager. The task can be, for example, management of a particular device or application that the e-manager manages. For example, the e-manager 102 could delegate a task to the e-manager 112 by delegating management responsibility for the e-service device 103 to the e-manager 112. In an exemplary embodiment, the e-integration manager can support a UDDI (Universal Description, Discovery and Integration) registry service which e-managers can use to register as a managed service.

The e-manager 102 can also transfer appropriate information for managing the e-service device 103 from the data storage 106 to the data storage 116 via the interfaces 161, 163 over a communication link 154. The e-integration manager can also query e-managers for information regarding their capabilities and responsibilities, and regarding any information stored in the database or database portions corresponding to the e-managers, for example the data storage 106, 116, 126. The e-integration manager GUI can perform the same functions as the GUIs 109, 119, 129. The GUI can be omitted from the e-integration manager. Management responsibilities can also be omitted from the e-integration manager. For example, where the e-manager 122 is implemented as an e-integration manager, management responsibilities for the e-service devices 123, 140, the e-application server 125, and the management applications 142, 144 can be omitted so that these entities are managed by a different e-manager.

In accordance with exemplary embodiments, an internal flow of an e-manager can include reading configuration information for the e-manager, which can for example be stored in the data storage of the e-manager. The configuration information can include e-integration manager information (for example, an e-integration manager that the e-manager is registered with or should register with), information identifying neighbors of the e-manager, and information identifying one or more "redundant" e-managers, or in other words one or more other e-managers that can assume the e-manager's responsibilities and functions in case of failover. A failover occurs when an e-manager cannot fulfill its responsibilities for some reason, for example due to overload, malfunction, crash, or loss of power, and another e-manager assumes its responsibilities and functions. The internal flow of the e-manager can also include building a list of neighbors to the e-manager, and validating the list by sending query messages to entities in the neighbor list (e.g., "areYouThere" queries). The internal flow of the e-manager can also include the e-manager registering itself with an e-integration manager by sending a message to the e-integration manager, for example an "IAm-Here" message along with hostname, port number and communication methods for the e-manager. In its internal flow, the e-manager can also execute management routine(s) to monitor or collect management data, can process all management data and store them in a common format, and can also process requests from e-integration manager(s) and/or e-manager GUI (Graphic User Interface) applications. The internal flow of the e-manager can also include discovering CDN (Content Delivery Network) devices to be managed by the e-manager, which can be done using a business logic of the e-manager. The internal flow of the e-manager can also include spawning a thread that functions as a request server to handle requests coming from an e-integration manager (e.g., get a report, get a device table, etc.), where the request server spawns a thread for each request, so that multiple requests can be executed concurrently. The internal flow of the e-manager can also include spawning SNMP polling threads to handle all scheduled SNMP polling, so that a thread is created for each device SNMP polling, where the SNMP polling threads generate SNMP data for each device and store the data locally (e.g., in a data storage of the e-manager). These functions can be done using a business logic of the e-manager. The internal flow of the e-manager can also include processing all collected SNMP and log data and store the data in an XML-format database (e.g., in a data storage of the e-manager or in another storage accessible to the e-manager). These functions can be done using a business logic of the e-manager. The internal flow of the e-manager can also include creating servlets to handle HTTP requests, and creating stylesheets for presenting XML format management data, and implementing XSLT (extensible Stylesheet Language Transformation) integration.

The configuration file or configuration information for the e-manager can be in XML. For example, the configuration file can take the following form:

```
<?xml version="1.0"?>
<!-- E-Manager Configuration -->
<PTP (Peer-to-Peer) CONFIG version="1.0">
   <PTPMANAGER type="EM" />
   <EMANAGER id="EM1" name="ABC">
   <SOCKET_SERVER>
      <SERVER_NAME>ovchia1.cnd.hp.com</SERVER_NAME>
      <SERVER_PORT>8899</SERVER_PORT>
   </SOCKET_SERVER>
   <HOST dnsname="ovchia1.cdn.hp.com">
      <HTTP_SERVER uri="ovchia1.cdn.hp.com:8080"
         context="ptpmgr/em"/>
   </HOST>
   <EINTEGRATION_MANAGER id="EIM1" name="EIM XYZ">
      <HOST dnsname ="chia.cdn.hp.com">
         <HTTP_SERVER uri="chia.cdn.hp.com:8888"
            context="ptpmgr/eim"/>
      </HOST>
   </EINTEGRATION_MANAGER>
   <NEIGHBORS>
      <EMANAGER id="EM2" name="XXX" >
         <HOST dnsname="ovchia2.cnd.hp.com">
            <HTTP_SERVER URI="ovchia2.cdn.hp.com:8080"
               context="ptpmgr/em" />
         </HOST>
      </EMANAGER>
      <EMANAGER id="EM3" name="YYY" >
         <HOST dnsname="ovchia3.cnd.hp.com">
            <HTTP_SERVER URI="ovchia3.cdn.hp.com:8080"
               context="ptpmgr/em" />
         </HOST>
      </EMANAGER>
   </NEIGHBORS>
   <FAILOVER_EM id="EM3" name="YYY" />
   <DEVICES>
      <DEVICE ip="15.2.116.84" dnsname="ovchia">
```

-continued

```
         <ACCESS method="snmp" interval="30"/>
      </DEVICE>
      <DEVICE ip="15.2.116.88" dnsname="ovchia8">
         <ACCESS method="ftp" interval="30"/>
      </DEVICE>
   </DEVICES>
   <COMMENTS>
      This EManager runs on ovchia1.cnd.hp.com;
      It is assigned to manage all CDN devices in Fort Collins site.
   </COMMENTS>
   <SUPPORT_DEVICES>
      <DEVICE snmpoid="1.3.6.1.4.1.3417.1.1.1 "
         model="CacheFlow Model 1000" vendor="CacheFlow"/>
      <CDN_DEVICE snmpoid="1.3.6.1.4.1.3417.1.1.2 "
         model="CacheFlow Model 100" vendor="CacheFlow"/>
   </SUPPORT_DEVICES>
   </EMANAGER>
</PTP (Peer-to-Peer) CONFIG>
```

In accordance with an exemplary embodiment, an e-manager, for example the e-manager 122, can be transformed into an e-integration manager. This can be done, for example, by sending a communication to all the other e-managers indicating that the e-manager 122 is now an e-integration manager, by delegating any operation and corresponding task(s) (e.g., management responsibilities for the e-service devices 123, 140, the e-application server 125, and the management applications 142, 144) to other e-managers, and by configuring or instructing the e-manager 122 to assume the responsibilities and functions of an e-integration manager. E-integration managers can be formed from the same base class as e-managers, for example where the managers are implemented in an object-oriented programming language or environment.

The e-integration manager can provide a common communication interface for integration, and can provide a layer of abstraction between the (other) e-managers and existing applications, for example Network Node Manager applications. The e-integration manager can function or serve as a central, integrated management system that receives, consolidates, synchronizes, processes, and analyzes management data provided by the e-managers. The e-integration manager can store the management data in a database (for example in a data storage of the e-integration manager or in another database available to the e-integration manager), and can forward the data to other applications upon request. The e-integration manager can integrate and pass on management data to existing applications, and can also pass information from existing applications to e-managers registered with the e-integration manager.

The e-integration manager can function as a clearinghouse for e-manager requests. For example, if an e-manager does not know who its neighbors are, the e-manager can query the e-integration manager which can consult its list and then provide the requested information to the e-manager. In addition, when an e-manager desires to delegate a task and cannot discern a qualified or able e-manager to accept the task, the delegating e-manager can ask the e-integration manager to identify possible candidates and/or query the possible candidates on behalf of the delegating e-manager. An e-manager can send a first query or request to the e-integration manager for information or a service, and the e-integration manager can query or otherwise communicate with other e-managers to satisfy the first query or request.

The e-integration manager can provide flexibility to support present and future standards and/or protocols. For example, XML/SOAP can be used, and later when any other protocols are adopted, the integration layer (e.g., the e-integration manager) can be changed or updated without affecting the e-manager structure/architecture. The e-integration manager can function as a virtual desktop for accessing, processing, and viewing a complete set or a subset of management data from all or just a selected subset of distributed management components, for example e-managers.

Generally, the e-integration manager can act as an additional resource to an e-manager, for example to provide information or a service to an e-manager that the e-manager is unable to obtain directly from other e-managers. The e-integration manager can receive and/or gather, and maintain, status information regarding all the e-managers and the network as a whole. The e-integration manager can provide a UDDI (Universal Description, Discovery and Integration) Service, for example to respond to user inquiries entered via a GUI connected to the e-integration manager or entered via a GUI connected to another e-manager and forwarded to the e-integration manager. In response to user inquiries, the e-integration manager can provide the reports described further above, regarding devices managed by all or selected ones of the e-managers, an overall view of e-managers in the system, and so forth. The e-integration manager can enable users to select and view a subset of data regarding and/or provided by the e-managers. The e-integration manager can communicate with existing applications (for example, entities other than e-managers, including existing applications), through a common interface, for example the peer-to-peer interface, and can transfer information between existing applications and one or more of the e-managers. The common interface can be XML-based. Multiple e-integration managers can be provided.

In accordance with exemplary embodiments, the e-integration manager can use the following internal process flow. The e-integration manager can read its configuration information during startup, and can build an initial list of registered e-managers based on the information retrieved from or provided by the configuration information. The e-integration manager can start an HTTP server waiting for HTTP requests, and can start a registration service, waiting for e-managers to register and adding newly registered e-managers to the e-integration manager's list of registered e-managers. The e-integration manager can also receive and process HTTP requests from applications or from e-managers, can poll or query e-managers, process responses received from e-managers, and send the requested results to applications or e-manager(s).

The configuration file or configuration information for the e-integration manager can be in XML. For example, the configuration file can take the following form:

```
<?xml version="1.0"?>
<!-- E Integration Manager Configuration -->
<PTP (Peer-to-Peer) CONFIG version="1.0">
    <PTPMANAGER type="EIM" />
    <EINTEGRATION_MANAGER id="EIM1" name="EIM XYZ">
        <HOST dnsname="chia.cnd.hp.com">
            <HTTP_SERVER URI="chia.cnd.hp.com:8888"
                context="ptpmgr/eim" />
        </HOST>
        <EMANAGERS>
            <EMANAGER id="EM1" name="ABC">
                <HOST dnsname="ovchia1.cnd.hp.com">
                    <HTTP_SERVER URI="ovchia1.cnd.hp.com:8080"
                        context="ptpmgr/em" />
                </HOST>
                <FAILOVER_EM id="EM3" name="YYY" />
                <COMMENTS>
                    EManager Sun runs on ovchia1.cnd.hp.com;
                    It is assigned to manage all CDN devices in Fort Collins site.
```

-continued

```
                </COMMENTS>
            </EMANAGER>
            <EMANAGER id="EM2" name="XXX">
                <HOST dnsname="ovchia2.cnd.hp.com">
                    <HTTP_SERVER URI="ovchia2.cdn.hp.com:8080"
                        context="ptpmgr/em" />
                </HOST>
                <COMMENTS>
                    EManager Chia runs on ovchia2.cnd.hp.com and
                    manages all CDN applications in Fort Collins site.
                </COMMENTS>
            </EMANAGER>
            <EMANAGER id="EM3" name="YYY">
                <HOST dnsname="ovchia3.cdn.hp.com">
                    <HTTP_SERVER URI="ovchia3.cnd.hp.com:8080"
                        context="ptpmgr/em" />
                </HOST>
                <COMMENTS>
                    EManager Sun runs on ovchia3.cnd.hp.com and
                    is the failover system for EManager ABC;
                    It manages subset of CDN devices with domain cnd.hp.com
                    in Fort Collins site.
                </COMMENTS>
            </EMANAGER>
        </EMANAGERS>
        <COMMENTS>
            This EIntegration Manager runs on chia.cnd.hp.com
        </COMMENTS>
    </EINTEGRATION_MANAGER>
</PTP (Peer-to-Peer) CONFIG>
```

In an example implementation, a user sends a request, for example an HTTP request, to an e-integration manager via a web browser, asking for a listing of all services managed by a specific e-manager. An HTTP server in the e-integration manager receives the request, and a servlet running on the server in the e-integration manager processes the request, creates a URL connection to the specific e-manager, and sends a corresponding request to the specific e-manager for the list of managed services. The request sent by the servlet to the specific e-manager can be a reformatted version of the request received from the web browser. A servlet running on the server in the e-manager receives the request from the servlet, identifies the relevant command in the request (e.g., "get services list"), and opens a socket connection with a daemon in the e-manager to obtain the desired information. The daemon responds to the "get services list" command, by obtaining the information and writing it to the socket (e.g., in XML format). To obtain the information, the daemon can spawn a request server to handle and execute multiple, concurrent requests for e-service management. For example, the concurrent requests can include requests such as "get a service list", "get a report for a specified service", and "get a general report". The daemon can also create a data collector to handle and execute all data pollings for all managed services or devices, concurrently. All service data polled can be stored in XML format. The e-manager can also include a data processor that can analyze all collected data and generate useful management information. The daemon can also create a log collector, and spawn an event server, to handle other kinds of requests that may be received from the e-integration manager or another e-manager.

The servlet running on the server in the e-manager receives the information from the daemon via the socket, and passes the information back to the e-integration manager, which in turn passes the information back to the user's web browser. The servlet running on the server in the e-manager can apply service table stylesheet(s) to the information received from the daemon, can transform the information into an HTML page, and then pass the HTML page to the e-integration manager, so that the e-integration manager can pass the HTML page to the web browser which displays the HTML page to the user.

Figure 3:
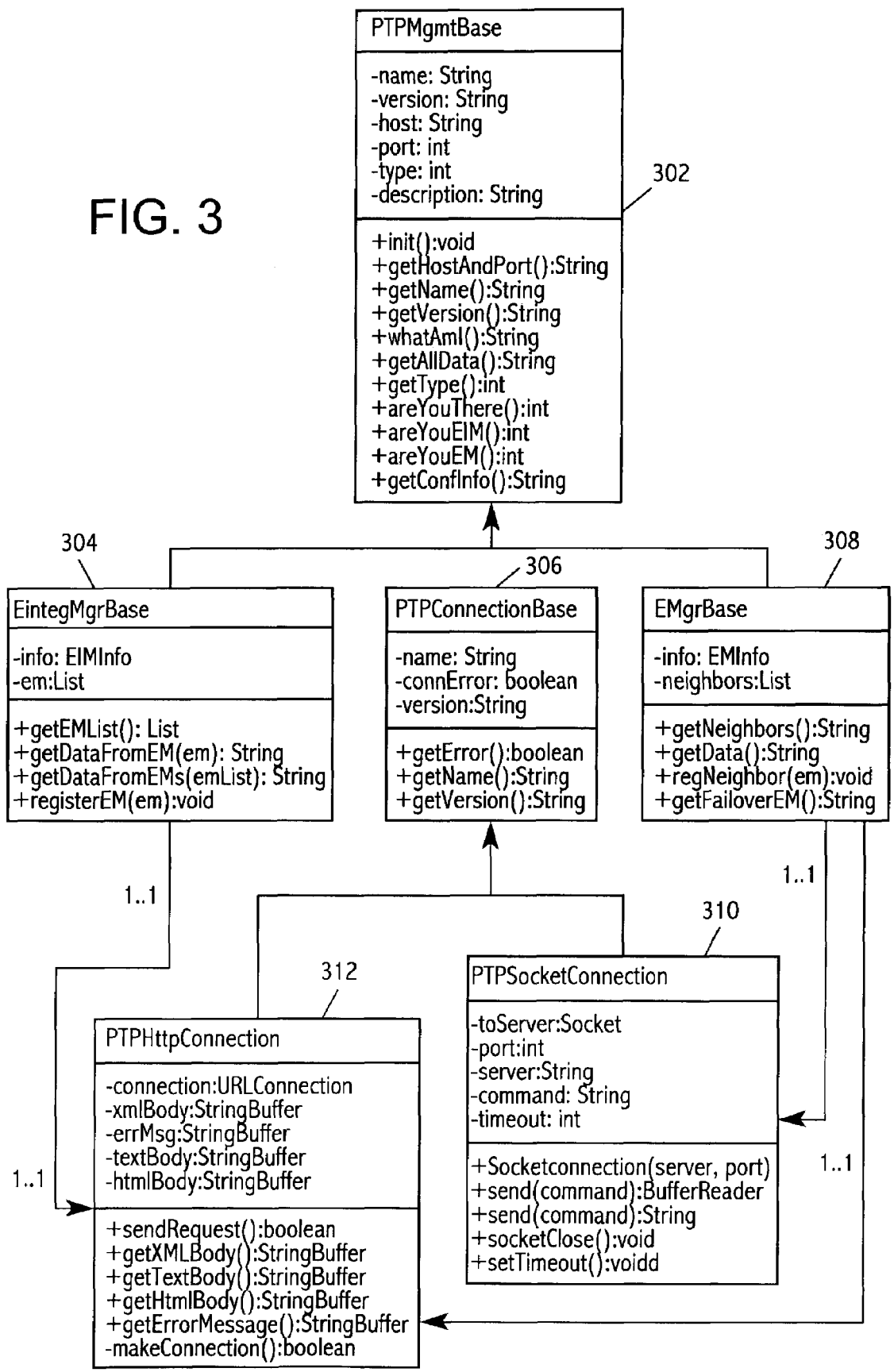
FIG. 3 illustrates an exemplary interface base class diagram.

In accordance with exemplary embodiments, the peer-to-peer interface can be implemented using an interface base class that is defined for XML-based communication. The class can be implemented on all e-managers and e-integration managers, and can be implemented together with common XML schemas, thereby enforcing common communication protocols between e-managers, e-integration managers, and other (e.g., existing) applications. This common peer-to-peer interface also provides a unified communications protocol to existing applications, and can be used to integrate the e-managers and e-integration managers with the existing applications. This abstraction layer also encapsulates implementation of a business logic for the e-management architecture. Predefined XML schemas can be used in the peer-to-peer interface to allow or enhance efficient data exchange. The interface base class can, for example, take the form shown in FIG. 3, where the designations "1..1 " indicate one-to-one relationships. FIG. 3 shows, for example, the following class elements: peer-to-peer management base 302; e-integration manager base 304; peer-to-peer connection base 306; e-manager base 308; peer-to-peer HTTP (Hyper Text Transfer Protocol) connection 312; and peer-to-peer socket connection 310.

Figure 2:
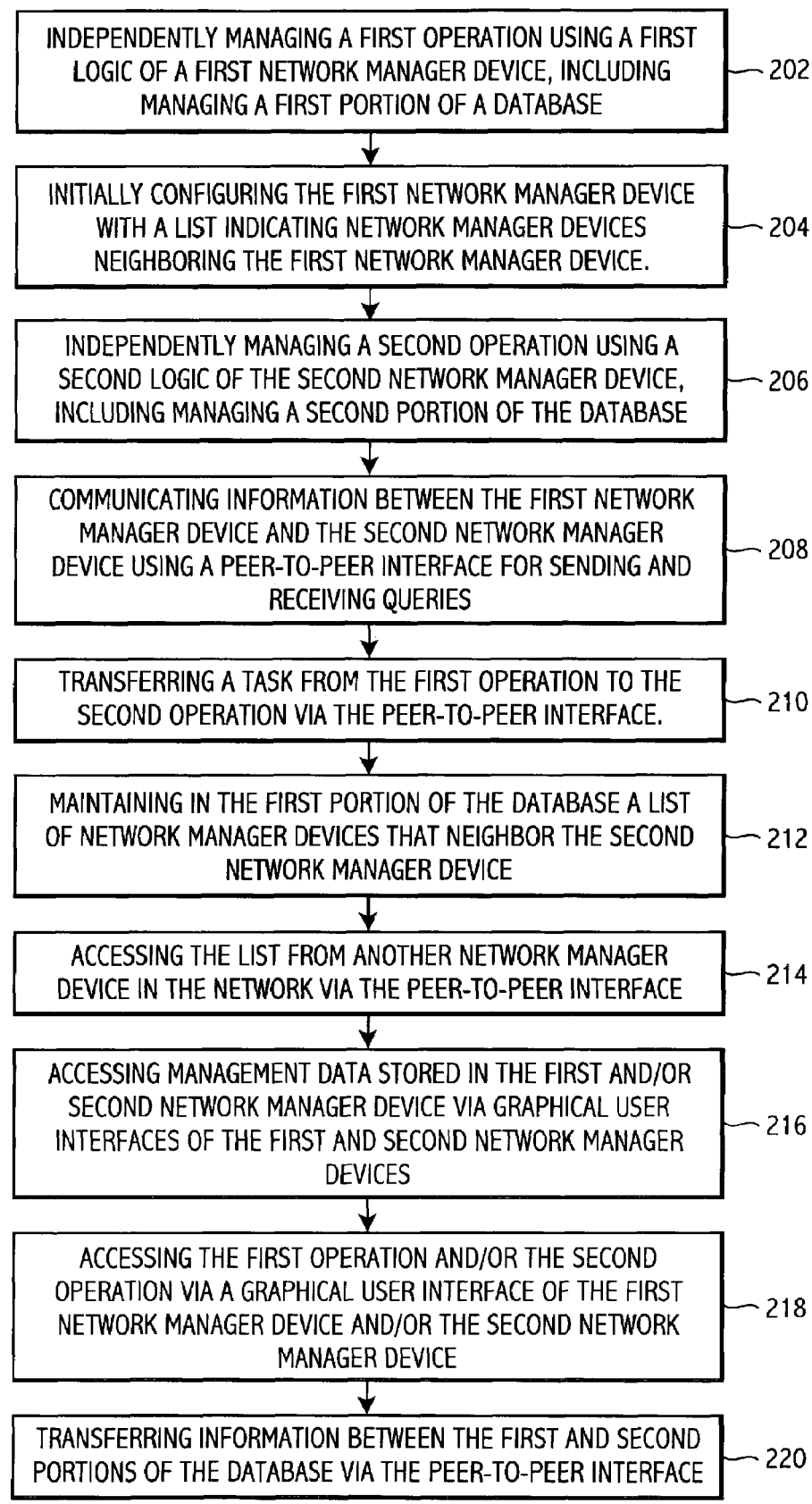
FIG. 2 illustrates an exemplary process.

FIG. 2 illustrates an exemplary process flow or method for managing a network having first and second network manager devices, for example the e-manager 102 and the e-manager 112 of FIG. 1. A subprocess 202 includes managing a first operation, for example the e-service device 103, the e-application server 105 and the network device 101 of FIG. 1, using a first logic of the first network manager device, including managing for example a first portion of a database. The logic can be, for example, the logic 108 of FIG. 1, and the first portion of the database can be the data storage 106. A subprocess 204 includes initially configuring the first network manager device with a list indicating network manager devices neighboring the first network manager device. The list can be the configuration information 107 of FIG. 1. A subprocess 206 includes independently managing a second operation using a second logic of the second network manager device, including managing a second portion of the database. The second network manager device can be the e-manager 112, the second operation can include the e-service device 113 and the e-application server 115, the second logic can be the logic 118, and the second portion of the database can be the data storage 116.

A subprocess 208 includes communicating information between the first network manager device and the second network manager device using for example a peer-to-peer interface for sending and receiving queries. The first network manager device can be, for example, one of the e-managers 102, 112, 122 and the second network manager device can be another of the e-managers 102, 112, 122. The interface can be appropriate ones of the interfaces 161, 163, 165. A subprocess 210 includes transferring a task from the first operation to the second operation via the peer-to-peer interface. The task can be, for example, an e-service device such as the device 103, 113, 123, 140, an e-application server such as the e-application server 105, 115, 125, a network device such as the device 101, and a management application such as the application 144, 142. A subprocess 212 includes maintaining in the first portion of the database a list of network manager devices that neighbor the second network manager device. the list can be included in a data storage such as a data storage 106, 116, 126.

A subprocess 214 includes accessing the list from another network manager device in the network via the peer-to-peer interface. For example, the e-manager 102 can access the data storage 116 of the emanager 112 via the interfaces 161, 163. A subprocess 216 includes accessing management data stored in the first and/or second network manager device via graphical user interfaces of the first and second network manager devices. For example, management data stored in the data storage 106, 116 can be accessed via the GUI 109, 119. A subprocess 218 includes accessing the first operation and/or the second operation via a graphical user interface of the first network manager device and/or the second network manager device. For example, the GUI 109 can be used to access the devices 103, 101 and the server 105 via the e-manager 102. The GUI 109 can also be used to access the device 113, and the server 115 via the e-manager 102 and the e-manager 112 over the link 154 via the interfaces 161, 163. A subprocess 220 includes transferring information between the first and second portions of the database via the peer-to-peer interface. For example, information can be transferred from the data storage 126 to the data storage 116 via the interfaces 165, 163 over the communication link 156. The information can be transferred to a) respond to a request entered via the GUI 119, b) complete delegation of a task from the e-manager 122 to the e-manager 112, c) to effect a registration of the e-manager 122 with the e-manager 112 where the e-manager 112 is implemented or configured to function as an e-integration manager, and so forth.

Those of ordinary skill in the art will recognize that procedures and processes outlined in FIG. 2 and described with respect to selected elements shown in FIG. 1, can be appropriately applied in similar fashion to any of the elements shown in FIG. 1. For example, with respect to subprocess 218, the GUI 109 is described as being able to access the device 103 via the e-manager 102. In a similar fashion, the GUI 129 can be used to access the management application 144 via the e-manager 122, and so forth.

Regarding failover, the neighbor list kept by each e-manager can provide an efficient and effective mechanism for handling failover management issues. In an example scenario, a first e-manager does not have a redundant system configured at startup, so it sends out a query to each of its neighbors (e.g., neighboring e-managers and/or e-integration manager(s)) to look for a failover system that can manage the network devices/processes that it manages, for example Content Delivery Network (CDN) devices. A second e-manager with extra capacity that is capable of managing the devices/processes currently managed by the first e-manager, replies to the query and indicates it can assume responsibility in the event of failover. The first e-manager receives the reply, and updates its configuration information accordingly to indicate that responsibilities can be transferred to the second e-manager in the event a failover of the first e-manager occurs. Those skilled in the art will recognize that the first e-manager can receive replies from multiple e-managers for different or same types of devices/processes, so that multiple e-managers can be noted in the first e-manager's configuration information as failover candidates, and upon failover of the first e-manager the responsibilities can be apportioned among multiple other e-managers, according to device/process type and/or e-manager capacity.

In another example failover scenario, a first e-manager is about to be shut down for maintenance. The first e-manager checks its configuration information for a redundant system or second e-manager to assume the first e-manager's responsibilities. If the first e-manager cannot find failover system information in the configuration information, it sends a query message (e.g., "identifyFailOver") to all its neighbors. A second e-manager responds as the first e-manager's failover system, and starts preparing to assume management responsibilities from the first e-manager. The second e-manager may already have a list of devices currently managed by the first e-manager. The first e-manager sends a list of managed devices and other management information or data to the failover system (i.e., the second e-manager). The e-integration manager is also notified of the impending responsibility transfer. The e-integration manager updates the status indication for the first e-manager in the e-integration manager's database, to a down status. The second e-manager confirms that it has received the management information from the first e-manager, the first e-manager shuts down, the second e-manager assumes the management responsibilities of the first e-manager and informs the e-integration manager, which updates its status for the second e-manager. Then the second e-manager manages and monitors the set of devices/processes it received from the first e-manager. Later, when the first e-manager comes back on line, it sends an alert message, for example an "IAmLive" message, so the second e-manager. In response, the second e-manager sends current management information to the first e-manager and stops managing the devices/processes, and the first e-manager resumes managing the devices/processes it had earlier handed off to the second e-manager. The e-integration manager also updates its status indications for the first and second e-managers.

In another example failover scenario, the first e-manager dies unexpectedly without handing off responsibility for devices/processes it was managing. A Management Application (MA) discovers that the first e-manager has died, and informs the e-integration manager about the first e-manager's failure. The MA and/or the e-integration manager determines a suitable candidate to assume management responsibilities for the devices/processes orphaned by the first e-manager. For example, the second e-manager can be selected to assume the management responsibilities. The e-integration manager sends a failover action message to the second e-manager to cause it to assume the responsibilities, and the second e-manager starts to manage the devices/processes orphaned by the first e-manager.

The exemplary architectures and mechanisms described herein with respect to the exemplary embodiments provide numerous advantages. For example, exemplary embodiments a) provide centralized management control (e.g., via the e-integration manager) across distributed and localized management (e.g., via e-managers), b) consolidate management information for multiple e-managers into a central management console (e.g., using filtering, processing, regrouping and so forth), c) seed the manageability for different sites, c) enable easy failover deployment, d) provide a standard communication protocol of XML-SOAP over HTTP/HTTPS, e) enable portable data, f) provide scalability, and g) allow coordination and federation of management. The common interface base classes and predefined XML schemas disclosed herein, can enforce a common communication protocol using XML/SOAP technologies that enable easy and efficient communications among management systems and easy integration with any existing management application. Defining the common interfaces using XML/SOAP technology can provide all client applications with a common platform to receive data in a universal language.

The methods, logics, techniques and pseudocode sequences described above for performing or implementing various features of the exemplary embodiments, can be implemented in a variety of programming styles (for example Structured Programming, Object-Oriented Programming, and so forth) and in a variety of different programming languages (for example Java, C, C ++, C#, Pascal, Ada, and so forth). Also, the e-managers and e-integration managers described herein can be implemented to include a microprocessor, computer, or any other computing device, and can be implemented in hardware and/or software, in a single physical location or in distributed fashion among various locations or host computing platforms. For example, the e-managers and e-integration managers can be network software components residing in a computer system, and can be independent.

Persons skilled in the art will appreciate that a machine readable medium can include software or computer program (s) for causing a computing device to perform the exemplary method(s) and processes described herein.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

The invention claimed is:

1. A method of managing a network, the network having first and second network manager devices, the method comprising:
   independently managing a first operation using a first logic of the first network manager device, including managing a first portion of a database;
   independently managing a second operation using a second logic of the second network manager device, including managing a second portion of the database; and
   communicating information between the first network manager device and the second network manager device using a peer-to-peer interface for sending and receiving queries,
   wherein the first network manager device maintains a list of network manager devices that neighbor at least one other network manager device, the list being accessible to the second network manager device via the peer-to-peer interface.

2. The method of claim 1, wherein the first and second logics are business logics.

3. The method of claim 1, comprising: transferring a task from the first operation to the second operation via the peer-to-peer interface.

4. The method of claim 1, wherein the peer-to-peer interface is implemented using XML/SOAP over HTTP/HTTPS.

5. The method of claim 4, wherein the first and second network manager devices are on opposite sides of a firewall.

6. The method of claim 1, wherein the first network manager device is initially configured with a list indicating network manager devices neighboring the first network manager device.

7. The method of claim 1, wherein each of the first and second operations include managing at least one of an e-service device and an e-service application.

8. The method of claim 7, wherein the first and second network manager devices each include a graphical user interface that enables access to management data stored in the first and second network manager devices and access to the first and second operations.

9. The method of claim 1, wherein the first portion of the database contains information about the first operation, and the second portion of the database contains information about the second operation.

10. The method of claim 9, wherein the first portion of the database contains information about the second operation.

11. The method of claim 10, comprising: transferring information between the first and second portions of the database via the peer-to-peer interface.

12. A system for managing a network having a plurality of network manager devices, the system comprising:
   a database;
   a first network manager device, said first network manager device having a first logic adapted to independently manage a first operation, including managing a first portion of the database;
   a second network manager device, said second network manager device having a second logic adapted to independently manage a second operation, including managing a second portion of the database; and
   a peer-to-peer interface adapted to send and receive queries, said peer-to-peer interface communicating information between the first network manager device and the second network manager device,
   wherein the first network manager device maintains a list of neighboring network manager devices that neighbor at least one other of the plurality of network manager devices, the list being accessible to the second network manager device via said peer-to-peer interface.

13. The system of claim 12, wherein the database contains information about the different operation.

14. The system of claim 12, wherein the database of one of the plurality of network manager devices contains information about the different operation of a different network manager device in the plurality.

15. A machine-readable storage medium comprising a computer program for causing a computer to:
   independently manage a first operation using a first logic of the first network manager device, including managing a first portion of a database;
   independently manage a second operation using a second logic of the second network manager device, including managing a second portion of the database; and
   communicate information between the first network manager device and the second network manager device using a peer-to-peer interface for sending and receiving queries,
   wherein the first network manager device maintains a list of network manager devices that neighbor at least one other network manager device, the list being accessible to the second network manager device via the peer-to-peer interface.

16. The medium of claim 15, wherein the first and second logics are business logics.

17. The medium of claim 15, wherein the computer program causes the computer to: transfer a task from the first operation to the second operation via the peer-to-peer interface.

18. The medium of claim 15, wherein the peer-to-peer interface is implemented using XML/SOAP over HTTP/HTTPS.

19. The medium of claim 18, wherein the first and second network manager devices are on opposite sides of a firewall.

20. The medium of claim 15, wherein the first network manager device is initially configured with a list indicating network manager devices neighboring the first network manager device.

21. The medium of claim 15, wherein each of the first and second operations include managing at least one of an e-service device and an e-service application.

22. The medium of claim 21, wherein the first and second network manager devices each include a graphical user interface that enables access to management data stored in the first and second network manager devices and access to the first and second operations.

23. The medium of claim 15, wherein the first portion of the database contains information about the first operation, and the second portion of the database contains information about the second operation.

24. A system for managing a network having data processing means for processing instructions stored in computer-readable storage media, the system comprising:
   a first network manager device including data processing means for independently managing a first operation using a first logic of the first network manager device, including managing a first portion of a database;
   a second network manager device including data processing means for independently managing a second operation using a second logic of the second network manager device, including managing a second portion of the database; and
   means for communicating information between the first network manager device and the second network manager device using a peer-to-peer interface for sending and receiving queries,
   wherein the first network manager device maintains a list of network manager devices that neighbor at least one other network manager device, the list being accessible to the second network manager device via the peer-to-peer interface.

25. The system of claim 24, wherein the first and second logics are business logics.

26. The system of claim 24, comprising: means for transferring a task from the first operation to the second operation via the peer-to-peer interface.

27. The system of claim 24, wherein the peer-to-peer interface is implemented using XML/SOAP over HTTP/HTTPS.

28. The system of claim 27, wherein the first and second network manager devices are on opposite sides of a firewall.

29. The system of claim 24, wherein the first network manager device is initially configured with a list indicating network manager devices neighboring the first network manager device.

30. The system of claim 24, wherein each of the first and second operations include managing at least one of an e-service device and an e-service application.

31. The system of claim 30, wherein the first and second network manager devices each include a graphical user interface that enables access to management data stored in the first and second network manager devices and access to the first and second operations.

32. The system of claim 24, wherein the first portion of the database contains information about the first operation, and the second portion of the database contains information about the second operation.

33. The system of claim 32, wherein the first portion of the database contains information about the second operation.

34. The system of claim 33, comprising: means for transferring information between the first and second portions of the database via the peer-to-peer interface.

* * * * *